(12) United States Patent
Kovak

(10) Patent No.: US 8,480,860 B2
(45) Date of Patent: Jul. 9, 2013

(54) DIVIDED WALL COLUMNS FOR SMALLER SIZED PLANTS

(75) Inventor: Kenneth William Kovak, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 727 days.

(21) Appl. No.: 12/255,842

(22) Filed: Oct. 22, 2008

(65) Prior Publication Data

US 2010/0096249 A1    Apr. 22, 2010

(51) Int. Cl.
*B01D 3/10*    (2006.01)
*B01D 3/14*    (2006.01)

(52) U.S. Cl.
USPC ............... 202/258; 196/111; 202/205; 203/1; 203/91; 261/114.4; 261/114.5; 261/DIG. 72

(58) Field of Classification Search
USPC ............. 202/205, 258; 261/114.4, 114.5, 261/DIG. 72; 203/1, 91; 196/111
See application file for complete search history.

(56) References Cited

U.S. PATENT DOCUMENTS

| 4,615,770 A | 10/1986 | Govind |
| 4,681,661 A | 7/1987 | Govind |
| 5,339,648 A | 8/1994 | Lockett et al. |
| 5,585,046 A | 12/1996 | Jansen et al. |
| 5,709,780 A | 1/1998 | Ognisty et al. |
| 5,785,819 A | 7/1998 | Kaibel et al. |
| 6,240,744 B1 * | 6/2001 | Agrawal et al. ................. 62/643 |
| 7,234,691 B2 | 6/2007 | Kovak |
| 7,357,378 B2 | 4/2008 | Zone et al. |
| 7,422,197 B2 | 9/2008 | Zone et al. |
| 7,604,222 B2 * | 10/2009 | Zone et al. ..................... 261/109 |
| 2001/0052453 A1 | 12/2001 | Rust et al. |
| 2003/0047438 A1 | 3/2003 | Tamura et al. |

FOREIGN PATENT DOCUMENTS

| DE | 43 36 986 A1 | 5/1995 |
| DE | 43 36 986 C2 | 5/1995 |
| EP | 1 108 965 A1 | 6/2001 |
| FR | 2 776 206 A1 | 9/1999 |
| WO | 99/01193 | 1/1999 |

OTHER PUBLICATIONS

Christiansen et al., Complex Distillation Arrangements: Extending the Petlyuk Ideas, Computers and I . . . Chemical Engineering, May 1997, vol. 21, No. Suppl. 1, pp. S237-S242 I.*

* cited by examiner

*Primary Examiner* — Virginia Manoharan
(74) *Attorney, Agent, or Firm* — Eric J. Schaal

(57) ABSTRACT

A divided exchange column includes a shell column having a first longitudinal axis, a cylindrical wall spaced apart from and surrounding the first longitudinal axis and defining a first interior space, a first divided wall column having a second longitudinal axis substantially parallel to the first longitudinal axis, and a second divided wall column having a third longitudinal axis substantially parallel to the first and the second longitudinal axes, where the first divided wall column and the second divided wall column are positioned in the first interior space of the shell column.

20 Claims, 5 Drawing Sheets

DIVIDED WALL COLUMNS FOR SMALLER SIZED PLANTS

BACKGROUND

Traditional methods for building divided wall columns for use in heat and/or mass transfer processes required welding a dividing wall in an appropriate location directly to a pressure shell column and then proceeding with the installation of packing or distillation trays on either side of the divided wall column. Other methods for building divided wall columns required that half-cylindrical shells be welded onto the dividing wall itself. Both methods required a welder, working inside the pressure shell column, to place welds on the interior wall of the column and the dividing wall to prevent leaks between these members.

The previous methods of manufacture and designs of divided wall columns for smaller sized applications, however, are problematic for several reasons.

First, use of a divided wall column incorporating a traditional dividing wall subjects the dividing wall to both pressure and temperature differences on both sides of the divided wall column. These temperature and pressure differences arise due to the very nature of divided wall column operation. On either side of the dividing wall, different mass transfer conditions are created by the varying liquid and vapor flows through the column sections. These diverse mass transfer conditions yield different composition profiles along the length of the divided wall sections. The different composition vapors and liquids having distinct saturation temperatures thus create temperature differences on either side of the dividing wall.

The temperature differences create significant mechanical stresses on both the dividing wall as well as the pressure shell column, and as such, have to be carefully monitored and managed during plant operation. The pressure and temperature differences especially are significant during operating upsets, for example, during the startup or shut down of the facility.

These upset conditions can be especially problematic when the operating temperatures of the column system deviate substantially from ambient conditions. For example, an air separation column operates under cryogenic conditions with temperatures reaching −195° C. At that temperature, care must be taken while cooling down the columns to ensure that both sides of the columns are cooled at a uniform rate (i.e., to prevent one column from cooling at a rate much faster than the opposite side of the column).

To combat these mechanical stresses, support members or stiffening members have been incorporated to prevent buckling, for example. As illustrated in U.S. Pat. No. 7,357,378, incorporated herein by reference in its entirety, these support members assist in withstanding the pressure differentials and minimizing the effect of the temperature differentials. Use of these support or stiffening members, however, may increase the cost and have a detrimental effect on the efficiency of the distillation process.

Increasing the thickness of the dividing wall to compensate for the mechanical stresses has also been attempted, however, the increase in strength realized is minimal, especially in columns having large diameters. Further, increasing the diameter of the dividing wall also leads to complications associated with the welding of the dividing wall to the column wall. Increasing the thickness of the dividing wall also causes occupation of a greater portion of the column area leading to less efficient use of the available area.

Use of double (laminated) or honeycombed walls, strengthening ribs, or using distillation trays as stiffeners to strengthen the dividing wall all suffer from the same drawbacks described above.

Second, with the increased demand for divided wall columns to be smaller, the space available for a welder to enter the pressure shell column and weld the dividing wall to the pressure shell column or the half-cylindrical shell to the dividing wall itself is problematic. For example, welding a dividing wall in columns with smaller diameters creates a measurably "tighter" clearance for the welder and welding tools to fit and work. In addition, welding shims, support members and/or stiffening members inside these small traditional divided wall columns is increasingly difficult.

BRIEF SUMMARY

Embodiments of the present invention satisfy a need in the art by providing an apparatus and method for facilitating the use of divided wall technology with the specific advantage of providing for the production of smaller column diameters than are currently manufactured or used.

In one embodiment, a divided exchange column includes a cylindrical shell column having a first longitudinal axis and a cylindrical wall spaced apart from and surrounding the first longitudinal axis, thereby defining a first interior space between the cylindrical wall and the first longitudinal axis, wherein the cylindrical wall comprises an inner surface and an outer surface; a first divided wall column having a second longitudinal axis substantially parallel to the first longitudinal axis, a first wall, and a second wall, where the first wall of the first divided wall column is coupled to the second wall of the first divided wall column, and where the first wall of the first divided wall column is substantially flat and the second wall of the first divided wall column is substantially semi-cylindrical; a second divided wall column having a third longitudinal axis substantially parallel to the first and the second longitudinal axes, a first wall, and a second wall, where the first wall of the second divided wall column is coupled to the second wall of the second divided wall column, and where the first wall of the second divided wall column is substantially flat and the second wall of the second divided wall column is substantially semi-cylindrical; and where the first divided wall column and the second divided wall column are positioned in the first interior space of the cylindrical shell column such that the first wall of the first divided wall column is adjacent to the first wall of the second divided wall column and the second wall of the first divided wall column and the second wall of the second divided wall column are adjacent to the inner surface of the cylindrical wall.

In another embodiment, the first wall of the first divided wall column and the first wall of the second divided wall column define a slot therebetween and where the slot extends from the first longitudinal axis to the inner surface of the cylindrical shell.

In another embodiment, the first divided wall column has a first length, and the second divided wall column has a second length. The first length of the first divided wall column and the second length of the second divided wall column may not be equal, for example.

In yet another embodiment, the shell column may be pressurized. In another embodiment, the shell column may be under vacuum conditions.

In another embodiment, the thickness of the first wall of the first divided wall column may be 3 mm to 20 mm.

In another embodiment, the first divided wall column comprises at least one distillation tray and where the second divided wall column comprises structured packing.

In yet another embodiment, a divided exchange column includes a first wall, where the first wall is substantially flat, a second wall, where the second wall is substantially semi-cylindrical and where the first wall and the second wall are coupled together such that the first wall and the second wall form a first exchange column with a cross-section that is substantially semi-cylindrical, a third wall, where the third wall is substantially flat, a fourth wall, where the fourth wall is substantially semi-cylindrical and where the third wall and the fourth wall are coupled together such that the third wall and the fourth wall form a second exchange column with a cross-section that is substantially semi-cylindrical, and a fifth wall, where the fifth wall is substantially cylindrical and forms a shell around the first exchange column and the second exchange column, and where the first wall of the first exchange column is adjacent and spaced from the third wall of the second exchange column.

In another embodiment, a divided exchange column comprising a cylindrical shell having a longitudinal axis and divided into two or more longitudinally extending part-cylindrical internal columns is characterized in that each of said internal columns is discretely preformed and has a respective part-cylindrical wall adjacent the cylindrical shell and terminating in two longitudinally extending edges and closed between said edges with one or more side walls.

In yet another embodiment, a divided exchange column comprises a first wall, where the first wall is substantially flat; a second wall, where the second wall is substantially semi-cylindrical and where the first wall and the second wall are coupled together such that the first wall and the second wall form a first exchange column; a third wall, where the third wall is substantially flat; a fourth wall, where the fourth wall is substantially semi-cylindrical and where the third wall and the fourth wall are coupled together such that the third wall and the fourth wall form a second exchange column; and a fifth wall, where the fifth wall is substantially cylindrical and forms a shell around the first exchange column and the second exchange column, and where the first wall of the first exchange column is adjacent and spaced apart from the third wall of the second exchange column.

BRIEF DESCRIPTION OF THE DRAWINGS

The foregoing brief summary, as well as the following detailed description of exemplary embodiments, is better understood when read in conjunction with the appended drawings. For the purpose of illustrating embodiments of the invention, there is shown in the drawings exemplary embodiments of the invention; however, the invention is not limited to the specific methods and instrumentalities disclosed. In the drawings.

DETAILED DESCRIPTION

Figure 1:
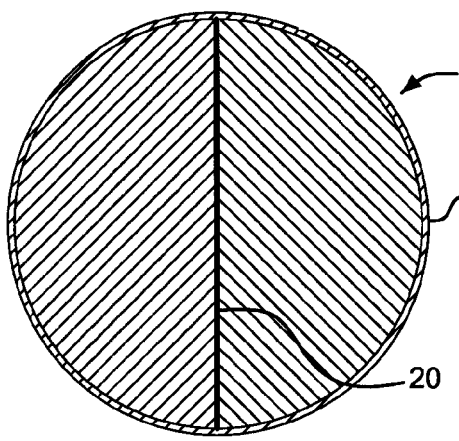
FIG. 1 is a schematic diagram illustrating a traditional divided wall column.

FIG. 1 illustrates a known traditional divided wall column 10 where a dividing wall 20 is welded to column 30.

Figure 2:
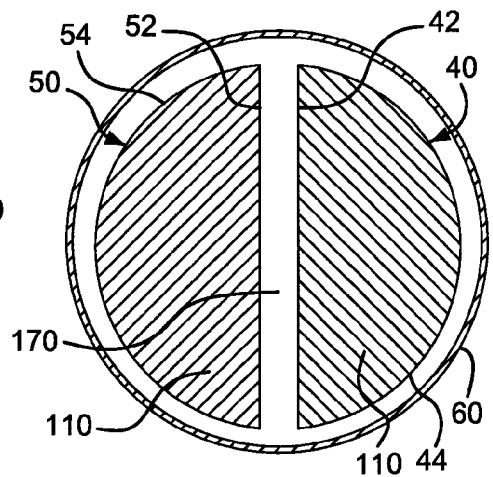
FIG. 2 is a schematic diagram illustrating an exemplary embodiment of the present invention.

FIG. 2 illustrates an embodiment of present invention where separate preformed divided wall columns 40, 50 may be constructed for use in a shell column 60. The shell column 60 may be pressurized, for example. The shell column 60 may also be under vacuum conditions, for example. The diameter of the shell column 60 may vary. For example, the diameter of the shell column 60 may be designed as a function of the design pressure. The shell column 60 may be cylindrical or substantially cylindrical, for example. The divided wall columns 40, 50 may be semi-cylindrical or substantially semi-cylindrical, for example.

Figure 3:
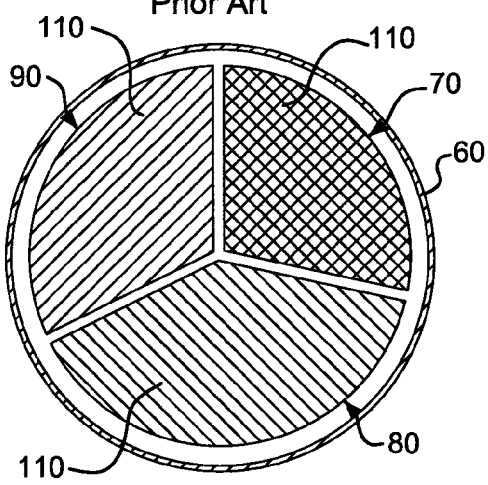
FIG. 3 is a schematic diagram illustrating an exemplary embodiment of the present invention.

In FIGS. 3-11, elements that correspond to elements in the previously illustrated embodiments are identified by the same number. As illustrated in FIG. 3, the divided wall columns 70, 80, 90 may also be substantially pie-shaped or substantially sectorial, for example, such that one or more divided wall columns may be positioned inside a shell column 60.

As further illustrated in FIG. 2, a planar or flat wall 42, 52 of the divided wall column 40, 50 may be welded to the semi-cylindrical wall 44, 54 of the divided wall column 40, 50 from outside the divided wall column 40, 50. Space restrictions that occur when working from the inside of the divided wall column 40, 50 may be eliminated because the welding may be performed from outside the divided wall column 40, 50. The thickness of the flat wall 42, 52 may vary. The flat wall 42, 52 thickness may be 3 mm to 20 mm, for example.

Figure 4:
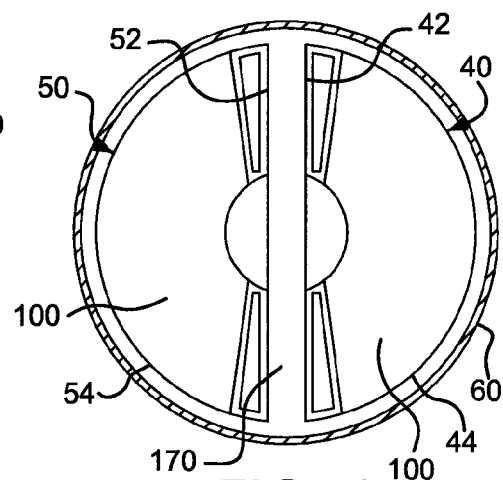
FIG. 4 is a schematic diagram illustrating an exemplary embodiment of the present invention.

As illustrated in FIGS. 2-4, each divided wall column 40, 50 (or 70, 80, 90 in FIG. 3) may have distillation trays 100 or packing 110 installed as appropriate. Distillation trays 100, disclosed in U.S. Pat. No. 7,234,691, which is herein incorporated by reference in its entirety, may be used, for example. The trays 100 may not directly contact the interior walls of the divided wall column 40, 50, 70, 80, 90 as they may be installed as a stack of self-supporting trays that hang from the top, for example.

Each divided wall column 40, 50, 70, 80, 90 may be separately installed into the shell column 60, for example.

In one embodiment, the divided wall column 40, 50, 70, 80, 90 may be secured to the shell column 60 at the top 120 of the divided wall column 40, 50, 70, 80, 90, for example. In an alternative embodiment, the divided wall column 40, 50, 70, 80, 90 may be secured to the shell column 60 at the bottom 130 of the divided wall column 40, 50, 70, 80, 90, for example. In another embodiment, a shear ring 140 may be used to affix the divided wall column 40, 50, 70, 80, 90 to the shell column 60, for example.

In another embodiment, telescoping shoes or spacers 150 may be used to fix the relationship of the divided wall columns 40, 50, 70, 80, 90 to the shell column 60 and each other.

Manufacturing the divided wall columns 40, 50, as illustrated in FIG. 2, for example, may diminish the effect of the mechanical stresses created by the pressure and temperature differences that typically occur on either side of the dividing wall because the two divided wall columns no longer share a common dividing wall 20, as illustrated in FIG. 1. The divided wall columns 40, 50 may be positioned apart such that an open space or slot 170 may be defined between the substantially flat walls 42, 52 of each divided wall column 40, 50. Use of the separated divided wall columns 40, 50 may allow for some freedom of movement that may be required by the temperatures and pressures that each divided wall column 40, 50 may experience without being directly affected by those of the other corresponding divided wall column. The independent sections are free to move independently from each other in response to whatever mechanical stresses are resulting from temperature and pressure differences. Thus, the effect of the mechanical forces due to the temperature and pressure differences is largely eliminated except for the single area where divided wall column 40, 50 is attached to the shell column 60 and the vapor seal is created.

Figure 5:
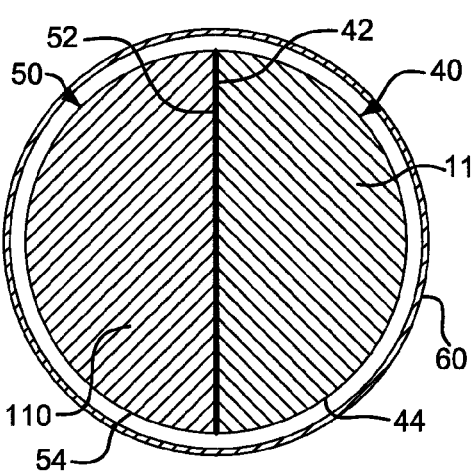
FIG. 5 is a schematic diagram illustrating an exemplary embodiment of the present invention.

In yet another embodiment, and as illustrated in FIG. 5, the divided wall columns 40, 50 may be positioned proximate to each other such that the substantially flat walls 42, 52 of each divided wall column 40, 50 are in direct contact with each other. In another embodiment, the substantially flat walls 42, 52 of each divided wall column 40, 50 may be coupled to each other, for example. The top of each divided wall column 40, 50 may be seal welded, for example.

Figure 6:
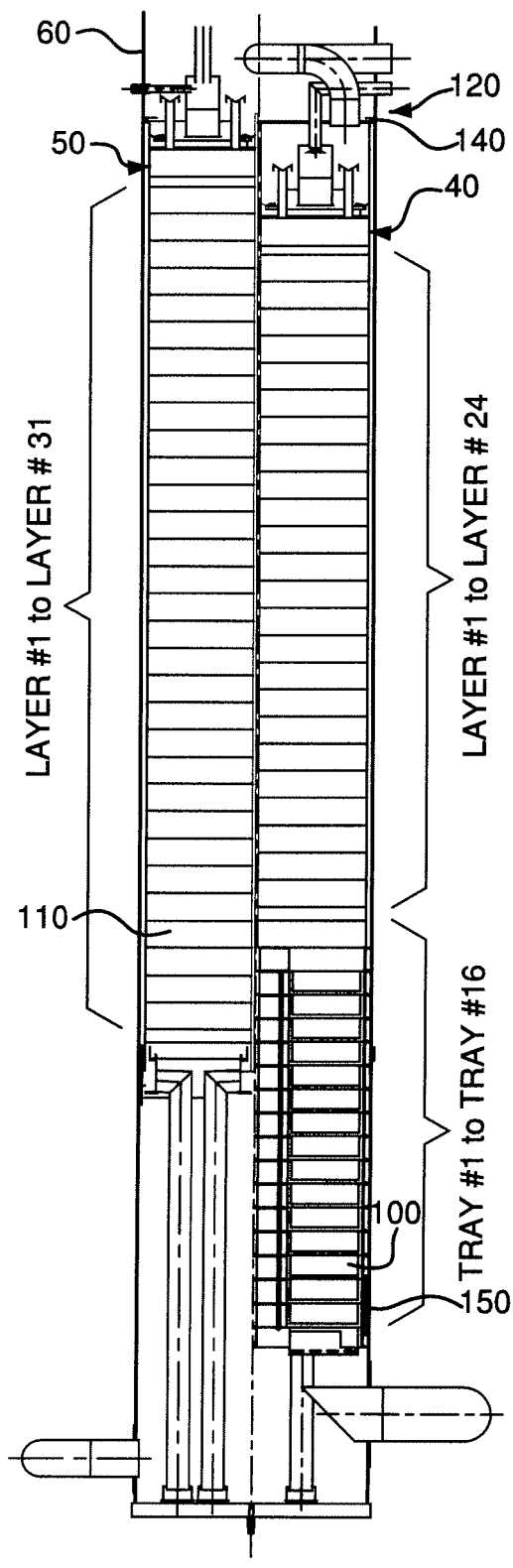
FIG. 6 is a schematic diagram illustrating an exemplary embodiment of the present invention.
Figure 7:
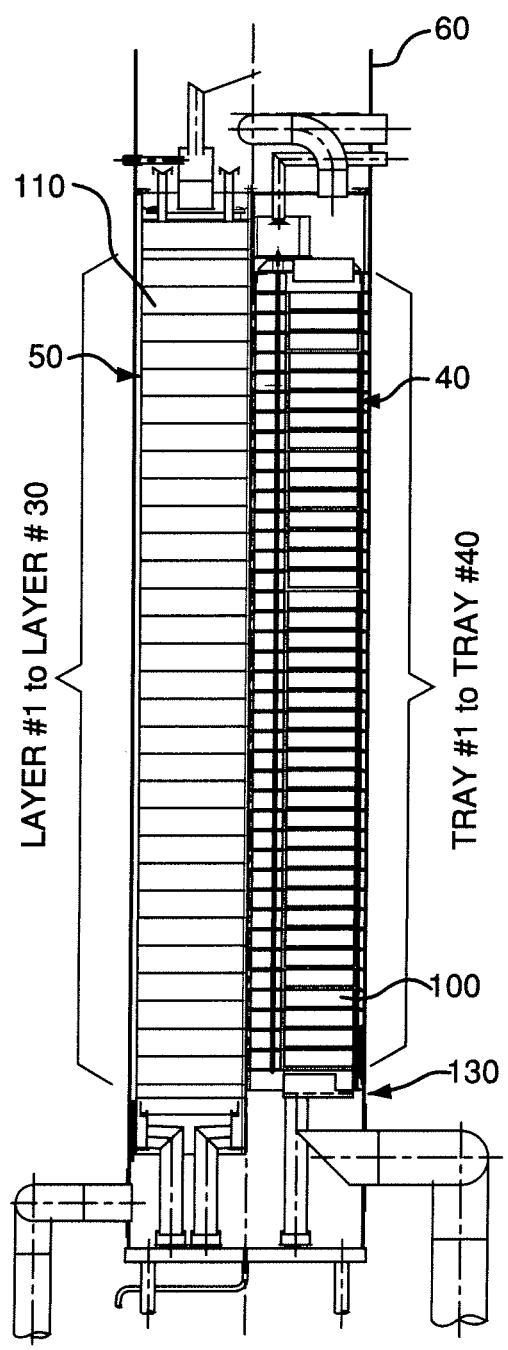
FIG. 7 is a schematic diagram illustrating an exemplary embodiment of the present invention.
Figure 8B:
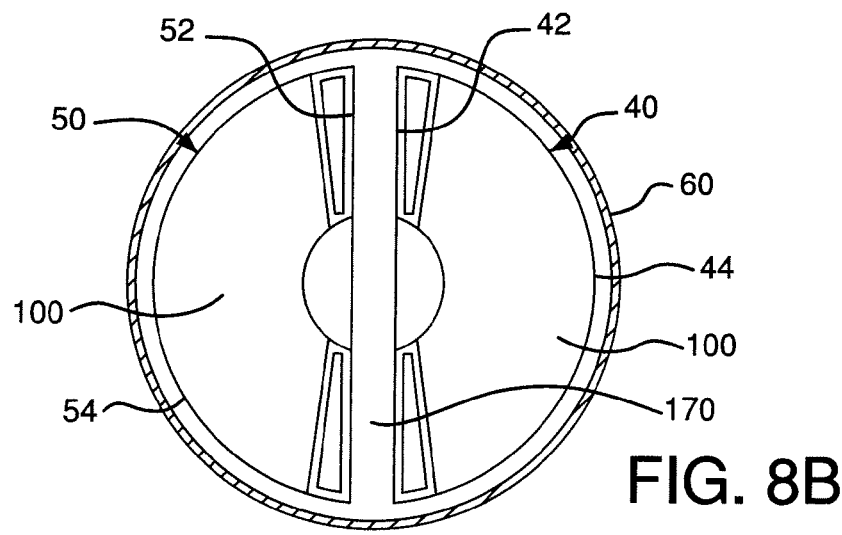
FIG. 8b is an enlarged cross-sectional schematic diagram of an exemplary embodiment of the present invention.
Figure 8A:
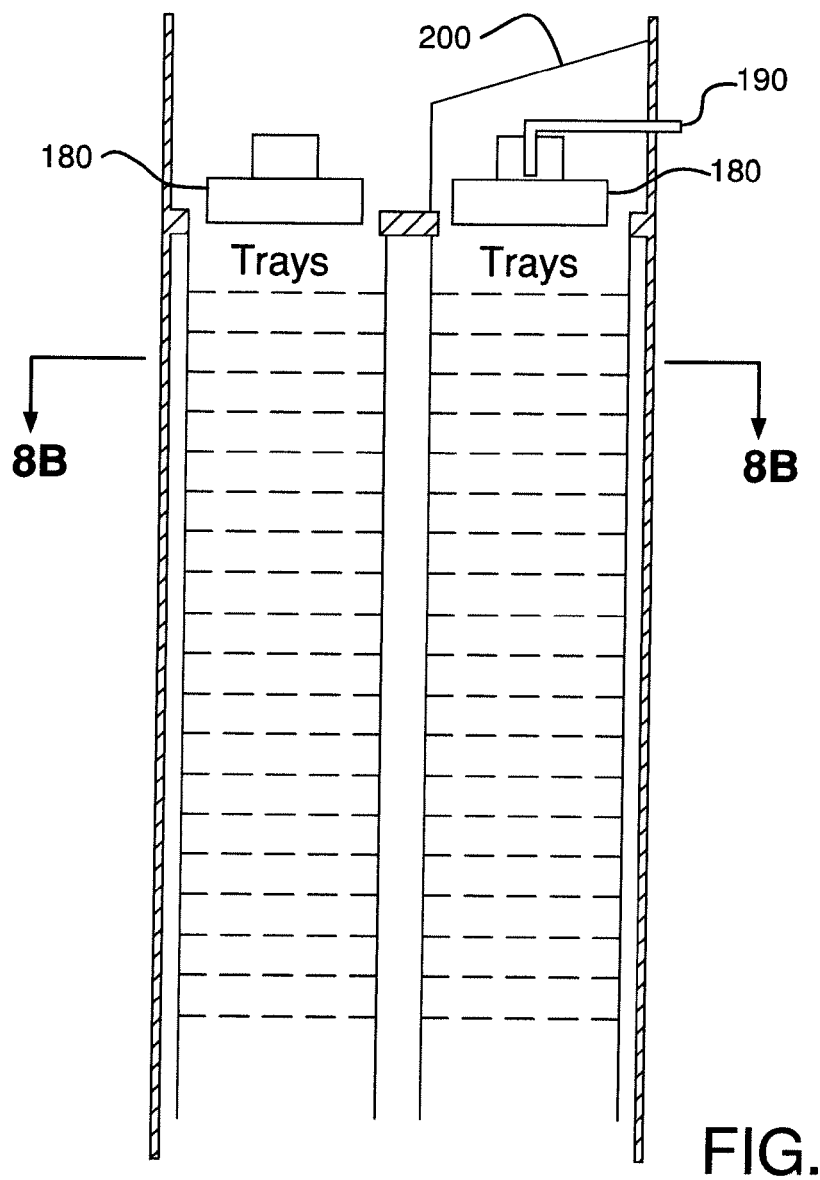
FIG. 8a is a schematic diagram illustrating an exemplary embodiment of the present invention.
Figure 9B:
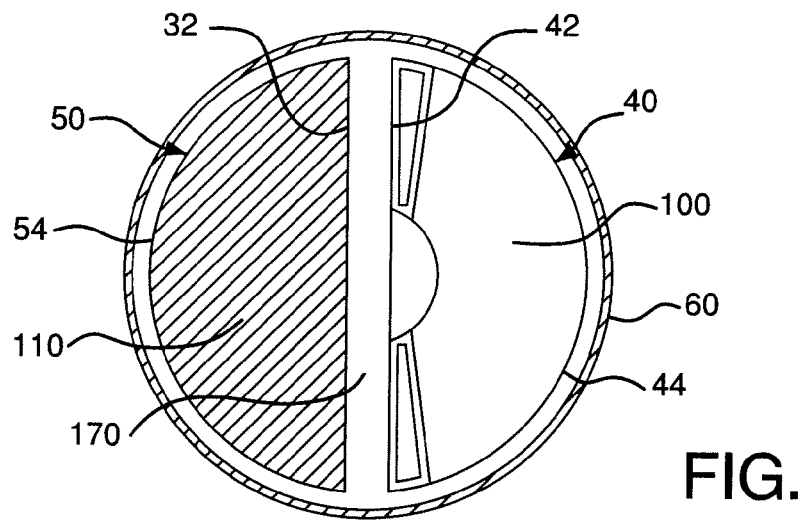
FIG. 9b is an enlarged cross-sectional schematic diagram of an exemplary embodiment of the present invention.
Figure 9A:
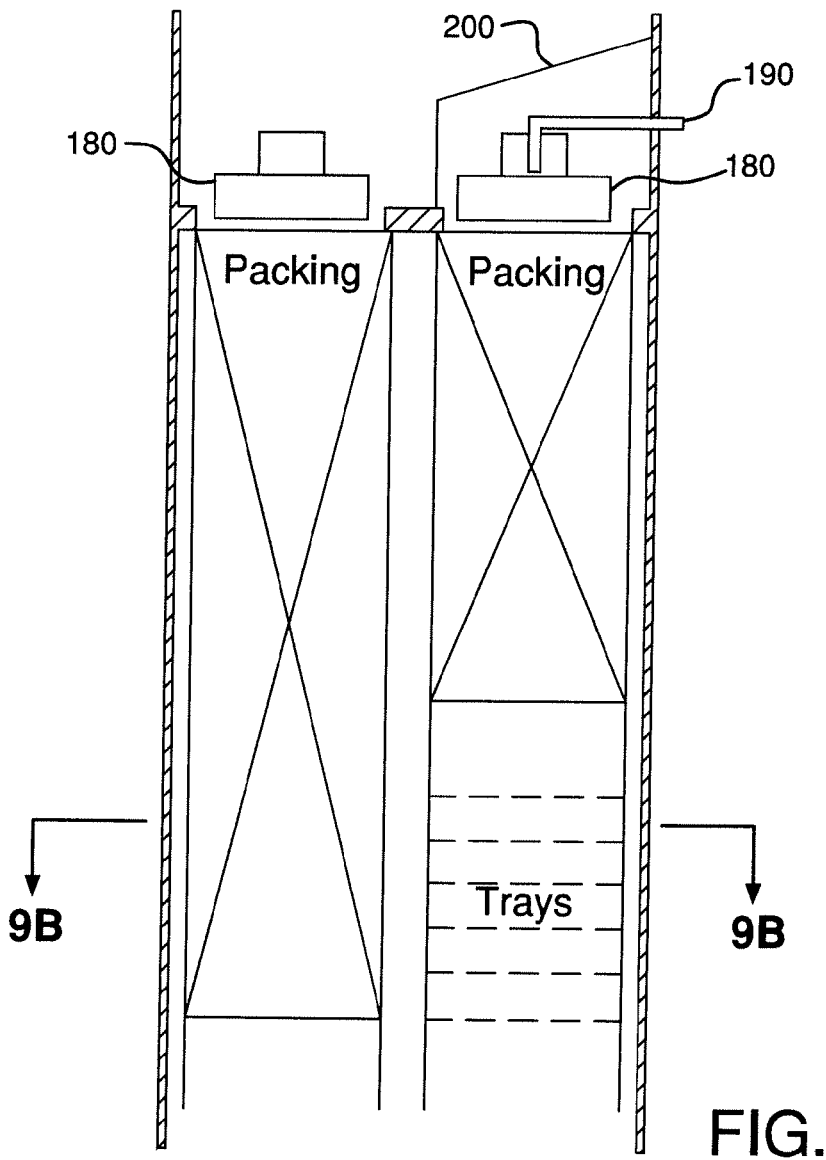
FIG. 9a is a schematic diagram illustrating an exemplary embodiment of the present invention.
Figure 10B:
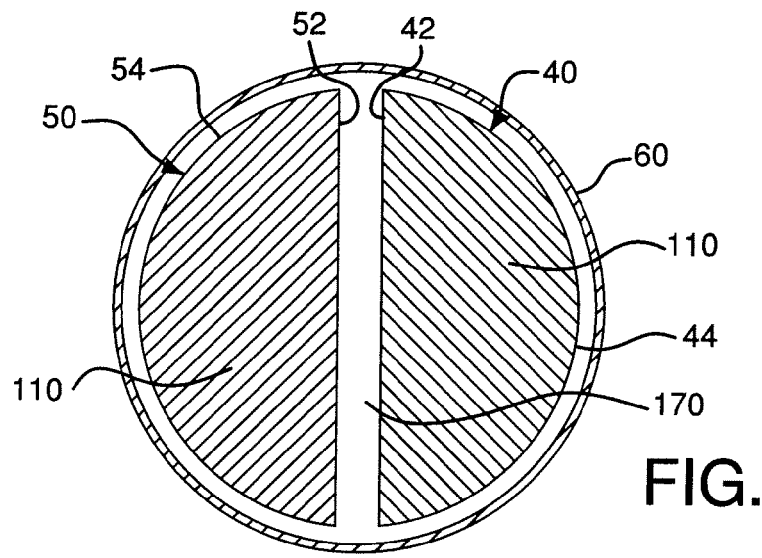
FIG. 10b is an enlarged cross-sectional schematic diagram of an exemplary embodiment of the present invention.
Figure 10A:
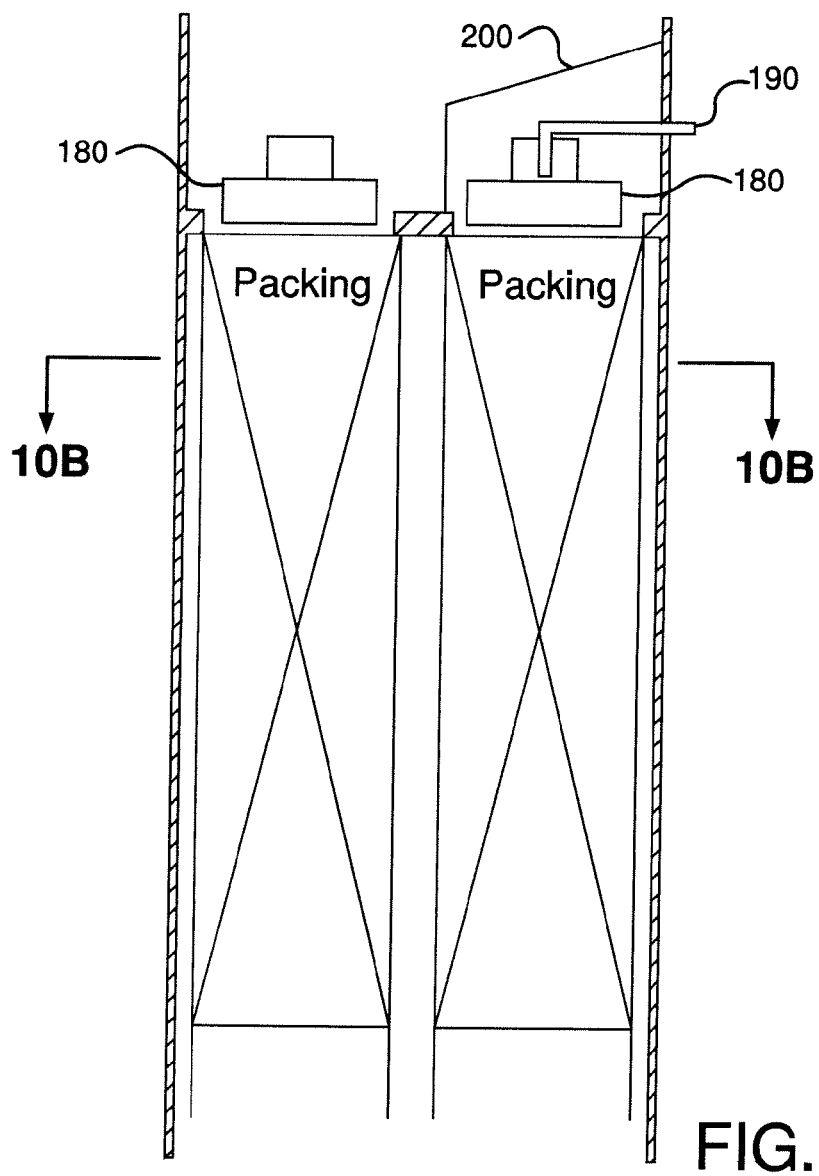
FIG. 10a is a schematic diagram illustrating an exemplary embodiment of the present invention.

As illustrated in FIG. 6, the divided wall columns 40, 50 inside the shell column 60 may have different lengths. For example, the length of first divided wall column 40 may be longer than the second divided wall column 50 because the specific separation requirements for the first divided wall column 40 may require more theoretical stages, for example. The lengths of the divided wall columns 40, 50 may also be substantially identical, as illustrated in FIG. 7. As illustrated in FIGS. 6-10*b*, the divided wall columns 40, 50, may incorporate distillation trays 100, packing 110, or various combinations thereof. As illustrated in FIGS. 8*a*-10*b*, each divided wall column 40, 50 may include a liquid distributor 180. The divided wall column 40, 50 may also include a feed nozzle 190 and a roof 200.

Figure 11:
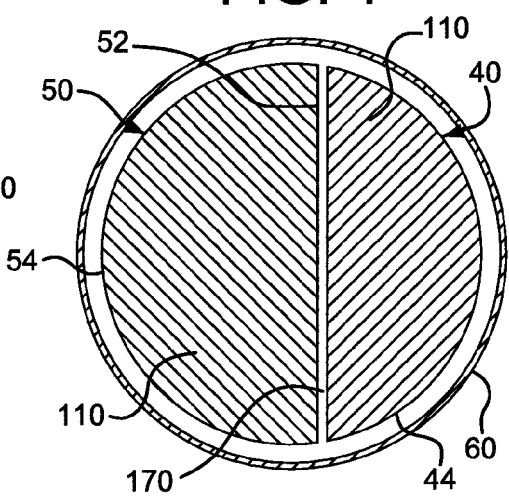
FIG. 11 is a schematic diagram illustrating an exemplary embodiment of the present invention.

In another embodiment, the divided wall columns 40, 50 may occupy non-equal portions of the total available area, for example. As illustrated in FIG. 11, a first divided wall column 40 may have a smaller area than a second divided wall column 50.

While aspects of the present invention has been described in connection with the preferred embodiments of the various figures, it is to be understood that other similar embodiments may be used or modifications and additions may be made to the described embodiment for performing the same function of the present invention without deviating therefrom. Therefore, the claimed invention should not be limited to any single embodiment, but rather should be construed in breadth and scope in accordance with the appended claims.

Aspects and embodiments of the invention include:

1. A divided exchange column comprising a cylindrical shell having a longitudinal axis and divided into two or more longitudinally extending part-cylindrical internal columns characterized in that each of said internal columns is discretely preformed and has a respective part-cylindrical wall adjacent the cylindrical shell and terminating in two longitudinally extending edges and closed between said edges with one or more side walls.

2. The divided exchange column of #1, wherein there are two complementary internal columns each having the part-cylindrical wall closed along its open side with a substantially flat chordal side wall.

3. The divided exchange column of #2, wherein the internal columns are semi-cylindrical.

4. A divided exchange column of #1, wherein there are three or more complementary sectorial internal columns each having a part-cylindrical wall closed along its open side with a pair of mutually angularly inclined substantially flat side walls.

5. A divided exchange column of any preceding #, wherein opposed side walls of adjacent internal columns are spaced apart.

6. A divided exchange column of any one of #1 to #4, wherein opposed side walls of adjacent internal columns are in contact.

7. A divided exchange column of any preceding #, wherein at least one of said internal columns contains distillation trays that do not directly contact the interior surfaces of the column.

8. A divided exchange column of #7, wherein said distillation trays are arranged in a self supporting stack that hangs from the top of said column.

9. A divided exchange column of any preceding #, wherein at least one of said internal columns is secured at its top to the shell.

10. A divided exchange column of any preceding #, wherein at least one of said internal columns is secured at its bottom to the shell.

11. A divided exchange column of any preceding #, wherein at least one of said internal columns is secured at to the shell by a shear ring.

12. A divided exchange column of any preceding #, wherein at least one of said internal columns is of smaller cross section than the at least one other said internal column.

13. A divided exchange column of any preceding #, wherein at least one of said internal columns is of shorter length than the at least one other said internal column.

14. A divided exchange column of any preceding #, wherein at least one of said internal columns comprises at least one distillation tray and wherein the at least one other internal column comprises structured packing.

15, A method of constructing a divided exchange column of #1 comprising inserting into a cylindrical shell having a longitudinal axis two or more discretely preformed longitudinally extending part-cylindrical internal columns each having a respective part-cylindrical wall adjacent the cylindrical shell and terminating in two longitudinally extending edges and closed between said edges with one or more side walls.

The invention claimed is:

1. A divided exchange column, comprising:
   a cylindrical shell column having a first longitudinal axis and a cylindrical wall spaced apart from and surrounding the first longitudinal axis thereby defining a first interior space between the cylindrical wall and the first longitudinal axis, wherein the cylindrical wall comprises an inner surface and an outer surface;
   a first preformed divided wall column having a second longitudinal axis substantially parallel to the first longitudinal axis, a first wall, and a second wall, wherein the first wall of the first preformed divided wall column is coupled to the second wall of the first preformed divided wall column, and wherein the first wall of the first preformed divided wall column is substantially flat and the second wall of the first preformed divided wall column is substantially semi-cylindrical;

a second preformed divided wall column having a third longitudinal axis substantially parallel to the first and the second longitudinal axes, a first wall, and a second wall, wherein the first wall of the second preformed divided wall column is coupled to the second wall of the second preformed divided wall column, and wherein the first wall of the second preformed divided wall column is substantially flat and the second wall of the second preformed divided wall column is substantially semi-cylindrical; and wherein the first preformed divided wall column and the second preformed divided wall column are positioned in the first interior space of the cylindrical shell column defining two longitudinally extending part-cylindrical internal columns, such that the first wall of the first preformed divided wall column is adjacent to the first wall of the second preformed divided wall column and the second wall of the first preformed divided wall column and the second wall of the second preformed divided wall column are adjacent to the inner surface of the cylindrical wall.

2. The divided exchange column of claim 1, wherein the first wall of the first preformed divided wall column and the first wall of the second preformed divided wall column define a slot therebetween, and wherein the slot extends from the first longitudinal axis to the inner surface of the cylindrical shell.

3. The divided exchange column of claim 1, wherein the first preformed divided wall column has a first length, and the second preformed divided wall column has a second length, and wherein the first length of the first preformed divided wall column and the second length of the second preformed divided wall column are not equal.

4. The divided exchange column of claim 1, wherein the cylindrical shell column is pressurized.

5. The divided exchange column of claim 1, wherein the cylindrical shell column is under vacuum conditions.

6. The divided exchange column of claim 1, wherein the first preformed divided wall column comprises at least one distillation tray and wherein the second preformed divided wall column comprises structured packing.

7. The divided exchange column of claim 1, wherein the first preformed divided wall column has a first area and the second preformed divided wall column has a second area and the first area is smaller than the second area.

8. A divided exchange column comprising a cylindrical shell having a longitudinal axis and divided into two or more longitudinally extending part-cylindrical internal columns characterized in that each of said internal columns is discretely preformed comprising a part-cylindrical wall adjacent the cylindrical shell and one or more side walls defining said discretely preformed internal column, wherein the thickness of each of the one or more side walls is 3 mm to 20 mm.

9. The divided exchange column of claim 8, wherein there are two complementary internal columns each having the part-cylindrical wall closed along its open side with a substantially flat chordal side wall.

10. The divided exchange column of claim 9, wherein the internal columns are semi-cylindrical.

11. The divided exchange column of claim 8, wherein there are three or more complementary sectorial internal columns each having a part-cylindrical wall closed along its open side with a pair of mutually angularly inclined substantially flat side walls.

12. The divided exchange column of claim 8, wherein the opposed side walls of the adjacent internal columns are spaced apart.

13. The divided exchange column of claim 8, wherein the opposed side walls of the adjacent internal columns are in contact.

14. The divided exchange column of claim 8, wherein the cylindrical shell is pressurized.

15. The divided exchange column of claim 8, wherein the cylindrical shell is under vacuum conditions.

16. A divided exchange column, comprising:

a first wall, wherein the first wall is substantially flat;

a second wall, wherein the second wall is substantially semi-cylindrical and wherein the first wall and the second wall are coupled together such that the first wall and the second wall form a first preformed exchange column;

a third wall, wherein the third wall is substantially flat;

a fourth wall, wherein the fourth wall is substantially semi-cylindrical and wherein the third wall and the fourth wall are coupled together such that the third wall and the fourth wall form a second preformed exchange column; and a fifth wall, wherein the fifth wall is substantially cylindrical and forms a shell around the first preformed exchange column and the second preformed exchange column, and wherein the first wall of the first preformed exchange column is adjacent and spaced apart from the third wall of the second preformed exchange column.

17. The divided exchange column of claim 16, wherein the first wall of the first preformed exchange column and the third wall of the second preformed exchange column define a slot therebetween, and wherein the second wall of the first preformed exchange column and the fourth wall of the second preformed exchange column are adjacent to an inner surface of the cylindrical fifth wall.

18. The divided exchange column of claim 16, wherein the shell is pressurized.

19. The divided exchange column of claim 16, wherein the thickness of the first wall of the first preformed exchange column and the third wall of the second preformed exchange column is 3 mm to 20 mm.

20. The divided exchange column of claim 16, wherein the first preformed exchange column has a first area and the second preformed exchange column has a second area and the first area is smaller than the second area.

* * * * *